(12) United States Patent
Marr

(10) Patent No.: US 11,380,143 B2
(45) Date of Patent: Jul. 5, 2022

(54) SYSTEM AND METHOD FOR SERVICING A DAMAGED VEHICLE

(71) Applicant: The Goodyear Tire & Rubber Company, Akron, OH (US)

(72) Inventor: Cary D. Marr, Van Buren, AR (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 16/887,457

(22) Filed: May 29, 2020

(65) Prior Publication Data

US 2020/0294326 A1 Sep. 17, 2020

Related U.S. Application Data

(63) Continuation of application No. 14/943,126, filed on Nov. 17, 2015, now abandoned.

(51) Int. Cl.
*G06Q 10/00* (2012.01)
*G07C 5/00* (2006.01)
(Continued)

(52) U.S. Cl.
CPC ............. *G07C 5/008* (2013.01); *G06Q 10/06* (2013.01); *G06Q 10/06311* (2013.01);
(Continued)

(58) Field of Classification Search
CPC .......... G07C 5/008; G07C 5/02; G07C 5/085; G06Q 50/30; G06Q 10/06; G06Q 10/20; G06Q 10/06311
See application file for complete search history.

(56) References Cited

U.S. PATENT DOCUMENTS 5,721,678 A 2/1998 Widl
5,726,885 A 3/1998 Klein et al.
(Continued)

FOREIGN PATENT DOCUMENTS

CA 2990669 A1 * 7/2018 ............ B25J 9/1674
EP 3254253 A1 * 12/2017 ............. G06Q 10/06
WO WO-2012068278 A1 * 5/2012 ............. G06Q 10/10

OTHER PUBLICATIONS

Authors: Disclosed Anonymously "Near Field Communication Between Vehicle Service System and Mobile Devices"; Apr. 17, 2013 (Year: 2013).*

*Primary Examiner* — Rutao Wu
*Assistant Examiner* — Tyrone E Singletary
(74) *Attorney, Agent, or Firm* — Wood Herron & Evans LLP

(57) ABSTRACT

A method and system to determine a selected service response for servicing a damaged portion of a vehicle using a vehicle technician system. The selected service response is based upon a digital media file acquired with the vehicle technician system and representative of the damaged portion of the vehicle. The digital media file is communicated from the vehicle technician system to an authority such as a vehicle owner. The communication may be indirectly through an intermediary such as a vehicle service management system. Inasmuch as the digital media file is inherently unbiased, the authority evaluates the digital media file when considering the appropriate service, such as repairing or replacing a damaged part. The authority then selects a selected service response based at least in part on the digital media file and the selected service response is thereafter applied to the vehicle.

20 Claims, 9 Drawing Sheets

(51) Int. Cl.
*G06Q 50/30* (2012.01)
*G06Q 10/06* (2012.01)
*G07C 5/02* (2006.01)
*G07C 5/08* (2006.01)

(52) U.S. Cl.
CPC ............. *G06Q 10/20* (2013.01); *G06Q 50/30* (2013.01); *G07C 5/02* (2013.01); *G07C 5/085* (2013.01)

(56) References Cited

U.S. PATENT DOCUMENTS

| | | | |
|---|---|---|---|
| 6,006,148 | A | 12/1999 | Strong |
| 6,295,449 | B1 | 9/2001 | Westerlage et al. |
| 6,339,745 | B1 | 1/2002 | Novik |
| 6,519,463 | B2 | 2/2003 | Tendler |
| 6,678,612 | B1 | 1/2004 | Khawam |
| 6,694,234 | B2 | 2/2004 | Lockwood et al. |
| 6,714,865 | B2 | 3/2004 | Angwin et al. |
| 6,828,924 | B2 | 12/2004 | Gustavsson et al. |
| 6,832,140 | B2 | 12/2004 | Fan et al. |
| 6,980,812 | B1 | 12/2005 | Sandhu et al. |
| 6,993,421 | B2 | 1/2006 | Pillar et al. |
| 7,035,647 | B2 | 4/2006 | de Verteuil |
| 7,050,818 | B2 | 5/2006 | Tendler |
| 7,138,913 | B2 | 11/2006 | Mackenzie et al. |
| 7,246,009 | B2 | 7/2007 | Hamblen et al. |
| 7,248,160 | B2 | 7/2007 | Mangan et al. |
| 7,305,243 | B1 | 12/2007 | Tendler |
| 7,308,273 | B2 | 12/2007 | Zhang |
| 7,317,975 | B2 | 1/2008 | Woolford et al. |
| 7,401,233 | B2 | 7/2008 | Duri et al. |
| 7,489,993 | B2 | 2/2009 | Coffee et al. |
| 7,706,808 | B1 | 4/2010 | Aggarwal et al. |
| 7,725,216 | B2 | 5/2010 | Kim |
| 7,859,392 | B2 | 12/2010 | McClellan et al. |
| 8,036,160 | B1 | 10/2011 | Oakes, III |
| 8,090,389 | B2 | 1/2012 | Tysowski |
| 8,229,462 | B2 | 7/2012 | Bennett, Jr. |
| 8,230,362 | B2 | 7/2012 | Couch |
| 8,340,904 | B2 | 12/2012 | Lin |
| 8,370,054 | B2 | 2/2013 | Crady et al. |
| 8,583,320 | B2 | 11/2013 | Harris et al. |
| 8,645,014 | B1* | 2/2014 | Kozlowski ............... H04W 4/70 701/24 |
| 8,792,913 | B2 | 7/2014 | Bennett, Jr. |
| 8,805,419 | B2 | 8/2014 | Marr et al. |
| 9,282,430 | B1* | 3/2016 | Brandmaier ........... G06Q 20/12 |
| 9,505,494 | B1* | 11/2016 | Marlow ............... G05D 1/0094 |
| 9,659,301 | B1* | 5/2017 | Briggs ................... G06F 16/22 |
| 2001/0039509 | A1 | 11/2001 | Dar et al. |
| 2002/0049535 | A1 | 4/2002 | Rigo et al. |
| 2002/0118796 | A1 | 8/2002 | Menard et al. |
| 2003/0163440 | A1* | 8/2003 | Tonack .............. G05B 23/0283 |
| 2003/0236723 | A1 | 12/2003 | Angott |
| 2004/0142659 | A1 | 7/2004 | Oesterling |
| 2004/0192336 | A1 | 9/2004 | Walby |
| 2004/0198441 | A1 | 10/2004 | Cooper et al. |
| 2004/0199413 | A1* | 10/2004 | Hauser ................ G06Q 30/016 705/305 |
| 2004/0260470 | A1 | 12/2004 | Rast |
| 2004/0267410 | A1 | 12/2004 | Duri et al. |
| 2005/0091172 | A1 | 4/2005 | King et al. |
| 2005/0151655 | A1 | 7/2005 | Hamrick et al. |
| 2006/0202817 | A1 | 9/2006 | Mackenzie et al. |
| 2006/0217885 | A1 | 9/2006 | Crady et al. |
| 2006/0223494 | A1 | 10/2006 | Chmaytelli et al. |
| 2007/0149210 | A1 | 6/2007 | McKiou et al. |
| 2007/0197231 | A1 | 8/2007 | Lin |
| 2007/0210905 | A1 | 9/2007 | Battista |
| 2007/0213896 | A1 | 9/2007 | Fischer |
| 2007/0259637 | A1 | 11/2007 | Basir et al. |
| 2008/0051955 | A1 | 2/2008 | Ross et al. |
| 2008/0204555 | A1 | 8/2008 | Hughes |
| 2008/0262670 | A1 | 10/2008 | McClellan et al. |
| 2008/0269978 | A1 | 10/2008 | Shirole et al. |
| 2008/0305763 | A1 | 12/2008 | Wijayanathan et al. |
| 2008/0319602 | A1 | 12/2008 | McClellan et al. |
| 2009/0005019 | A1 | 1/2009 | Patel et al. |
| 2009/0037045 | A1 | 2/2009 | Ampunan et al. |
| 2009/0045924 | A1 | 2/2009 | Roberts, Sr. et al. |
| 2009/0055091 | A1 | 2/2009 | Hines et al. |
| 2009/0181699 | A1 | 7/2009 | Tysowski |
| 2009/0214000 | A1 | 8/2009 | Patel et al. |
| 2009/0233572 | A1 | 9/2009 | Basir |
| 2009/0313077 | A1 | 12/2009 | Wheeler, IV |
| 2009/0326991 | A1 | 12/2009 | Wei et al. |
| 2010/0022255 | A1 | 1/2010 | Singhal |
| 2010/0136954 | A1 | 6/2010 | Bennett, Jr. |
| 2010/0159894 | A1 | 6/2010 | Rysenga et al. |
| 2010/0285817 | A1 | 11/2010 | Zhao et al. |
| 2010/0332133 | A1 | 12/2010 | Harris et al. |
| 2012/0131004 | A1* | 5/2012 | McDermott ........... G06Q 30/02 707/736 |
| 2012/0149324 | A1 | 6/2012 | Daly |
| 2012/0191616 | A1 | 7/2012 | Putman et al. |
| 2014/0019280 | A1* | 1/2014 | Medeiros ........... G06Q 10/0633 705/305 |
| 2014/0188999 | A1 | 7/2014 | Leonard et al. |
| 2014/0364080 | A1 | 12/2014 | Bennett, Jr. |
| 2015/0142256 | A1* | 5/2015 | Jones ..................... G06Q 10/06 701/31.4 |
| 2015/0324720 | A1* | 11/2015 | Briggs .................... H04W 4/02 705/7.22 |
| 2016/0092962 | A1* | 3/2016 | Wasserman ........... H04M 3/487 705/26.7 |

* cited by examiner

SYSTEM AND METHOD FOR SERVICING A DAMAGED VEHICLE

TECHNICAL FIELD

The invention is generally related to roadside service, more specifically to facilitating efficient decision making between a roadside service technician and a vehicle owner regarding service options.

BACKGROUND

Vehicle maintenance while on the road is an important issue for many commercial truck fleets. Even optimal maintenance between trips cannot eliminate the possibility of mechanical issues arising when vehicles are distant from a local repair source. For that reason, national roadside repair services exist and contract with fleets to repair vehicles wherever they break down. In some cases, a repair service is specific to certain features of the vehicle, such as a tire repair service or a windshield repair service.

Coordinating a roadside repair service typically involves the driver calling the vehicle owner and reporting the issue. The vehicle owner or the driver thereafter typically contact a roadside service technician or service and provide information regarding the vehicle owner, the vehicle damage or malfunction, and the location of the vehicle. The repair service may reference the vehicle location against a list of available roadside service technicians, which may be employed directly by the company providing the service or may work independently through a network service agreement as known in the art.

Once the roadside service technician arrives at the location, the technician generally assesses the situation and facilitates decisions regarding the service. Often a decision must be made between repairing a malfunctioning part or replacing the part entirely. The decision to repair or replace may turn on the relative cost involved, but often the decision turns on the status of the part itself. For example, a tire may be repaired if only minor damage has occurred or the damage has occurred at a repairable location of the tire. If the tire is severely damaged, or the damage has occurred in a non-repairable location of the tire, the tire may need replaced entirely. The vehicle owners often make the final decision on whether to repair or replace a damaged part.

However, in practice, the vehicle owner may not have detailed knowledge regarding the extent of damage to the part. As such, a vehicle owner generally may need to rely entirely on the physical description of the damaged part or malfunction provided over the phone by the repair technician.

In addition to the above, vehicle owners such as commercial truck fleet owners may need to report the status of the vehicle repair to a client awaiting a delivery by the broken down truck. However, again, the vehicle owner may not have detailed knowledge regarding the status of the repair because the repair technician typically must stop servicing the vehicle and call into a dispatcher at a call center to report the status of the repair and provide any relevant updates. The reporting process may be time consuming and disruptive for the roadside service technician. Compounding the problem is the dispatcher may quickly become unavailable due to other calls and may be difficult to contact as needed. Given the disruptive and unreliable nature of updating the vehicle owner during the repair process, roadside service technicians often do not update the vehicle owner during and throughout the repair process. The repair technicians typically report their arrival at the location and thereafter report the completion of the repair, with no updates in between for the vehicle owner to relay to the customer awaiting a delivery.

Therefore, a need exists in the art for a manner of evaluating roadside service issues to provide information to a vehicle owner regarding damaged parts, associated service options, and status updates, while also minimizing or eliminating the need for direct phone contact between the roadside service technician and the vehicle owner.

SUMMARY

In an embodiment of the invention, a method is provided for determining a selected service response for servicing a damaged portion of a vehicle. The method includes acquiring a digital media file with a vehicle technician system, wherein the digital media file is associated with the damaged portion of the vehicle. The method further includes communicating the digital media file from the vehicle technician system to an authority over a communication network. The method further includes receiving the selected service response from the authority, wherein the selected service response is selected based at least in part on the digital media file.

In another embodiment of the invention, a system is provided for servicing a damaged portion of a vehicle. The system includes a vehicle technician system, the vehicle technician system including at least one first processor and a first memory including instructions that, when executed by the at least one first processor, cause the vehicle technician system to acquire a digital media file representing the damaged portion of the vehicle. The instructions further cause the system to communicate the digital media file to an authority over a communication network. The instructions further cause the system to receive a service response selected by the authority, wherein the service response is selected based at least in part on the digital media file.

In another embodiment of the invention, a computer program product is provided which comprises a non-transitory computer-readable storage medium and instructions stored on the non-transitory computer-readable storage medium that, when executed by at least one processor, cause the at least one processor to acquire a digital media file representing a damaged portion of a vehicle. The instructions further cause the at least one processor to communicate the digital media file to an authority over a communication network. The instructions further cause the at least one processor to receive a service response selected by the authority from a plurality of proposed service responses, wherein the service response is selected based at least in part on the digital media file.

In an embodiment of the invention, a method is provided for brokering a repair of a damaged vehicle between a service technician and an authority. The method includes dispatching the service technician to the damaged vehicle. The method further includes receiving a digital media file from the service technician, wherein the digital media file is associated with a damaged portion of the damaged vehicle. The method further includes communicating the digital media file to the authority. The method further includes receiving a selected service response from the authority, wherein the selected service response is selected based at least in part on the digital media file. The method further includes communicating the selected service response to the service technician.

In an embodiment of the invention, a method is provided for brokering a repair of a damaged vehicle between a plurality of service technicians and an authority. The method includes selecting a set of potential service technicians from the plurality of potential service technicians. The method further includes transmitting a solicitation to a vehicle technician system of each service technician in the set of service technicians. The method further includes receiving a response from each of the service technicians in the set of service technicians. The method further includes selecting a responding service technician from the set of service technicians based at least in part on the response. The method further includes dispatching the responding service technician to the damaged vehicle.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE SEVERAL VIEWS OF THE DRAWINGS

The accompanying drawings, that are incorporated in and constitute a part of this specification, illustrate various embodiments of the invention and, together with the general description of the invention given above, and the detailed description of the embodiments given below, serve to explain the embodiments of the invention.

DETAILED DESCRIPTION

Figure 1:
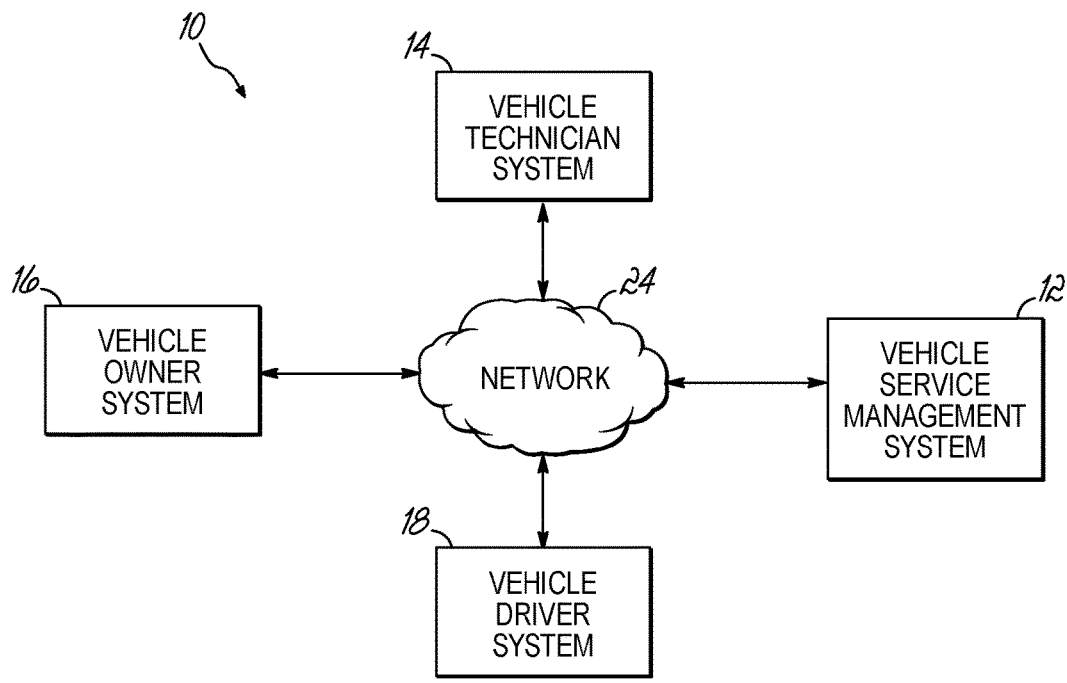
FIG. 1 is a diagrammatic view of an exemplary operating environment including a vehicle service management system, vehicle technician system, vehicle owner system, and vehicle owner system in communication with one another via a network.

The invention is directed to system for supplying information regarding a roadside service call from a roadside service technician to an authority during the service call. The authority may be an entity such as a vehicle owner or a proxy for the vehicle owner such as an employee, agent, or service provider having the authority to make decisions in response to queries from a service technician regarding service to a damaged portion of a vehicle. Hereinafter the authority will be referred to as the vehicle owner. Rather than relying on a telephone call between the vehicle owner and the service technician to transfer information regarding the service call, the invention provides a software application configured to work in conjunction with a vehicle technician system. The vehicle technician system may comprise a mobile computing device, such as a mobile phone or a tablet computer, or may comprise an application executable on a mobile computing device. The vehicle technician system is configured to gather data regarding the service call or the underlying damage to the vehicle and transfer the data to the vehicle owner.

Modern smart phones often have a number of features that can be used to gather relevant information regarding the service call or the underlying damage to the vehicle. By having a repair technician interface with an application of the vehicle technician system, which may be a mobile computing system such as a smart phone, information can be efficiently captured and transferred between the vehicle owner and the service technician. The most relevant information, and often the most difficult to accurately determine, is the status and the extent of the damage done to the vehicle undergoing a service call. The traditional phone call method relies entirely on the repair technician to accurately assess and articulate the condition of the damaged portion of the vehicle. The description provided by the roadside service technician may be biased or otherwise insufficient for the purpose of determining whether the part should be repaired or replaced. Further, the vehicle owner has no way of knowing whether the description provided by the repair technician is accurate.

Inasmuch as the vehicle technician system may comprise a mobile computing device such as a mobile phone or tablet computer, many modern web-enabled phones or tablet computers include a media capture device, such as a camera, which may capture digital media files such as still images sufficient for a vehicle owner to determine the extent of damage done to a part. In addition, many web-enabled phones are configured to transfer the captured images to applications residing thereon, which in turn may be configured to communicate the images to external computing devices by way of a network or the Internet. Many mobile computing devices further include a video camera function, which may capture digital media such as motion video sufficient for a vehicle owner to view a damaged part from many angles and provide a more complex representation of the damaged part. The present invention takes advantage of these capabilities of vehicle technician systems, such as mobile phones or tablet computers, in order to increase the accuracy and availability of information while putting fewer demands on the repair technician and to accurately describe and articulate the damage done to the vehicle.

Referring now to FIG. 1, an operating environment 10 in accordance with an embodiment of the invention may include or reside within a vehicle service management system 12. In general, the vehicle service management system 12 operates to coordinate or broker various business issues or situations that arise regarding a fleet of vehicles, and particular between a vehicle owner, a vehicle driver, and a vehicle technician. Operating environment 10 may further include a vehicle technician system 14, a vehicle owner system 16, and a vehicle driver system 18. In an embodiment of the invention, vehicle service management system 12 receives transmissions and communications from one of the vehicle technician system 14, the vehicle owner system 16, and the vehicle driver system 18 and forwards the transmissions or communications on to another of the vehicle technician system 14, the vehicle owner system 16, and the vehicle driver system 18. In this embodiment, each of the vehicle technician system 14, the vehicle owner system 16, and the vehicle driver system 18 contacts the vehicle service management system 12 in order to communicate with the other systems. As such, the vehicle technician system 14, the vehicle owner system 16, and the vehicle driver system 18 may not have direct access to one another, which allows vehicle service management system 12 to coordinate communication. Inasmuch as the vehicle service management system 12 is the centralized authority for communication within operating environment 10, vehicle technicians may only indirectly communicate with the vehicle owners and communications may be coordinated.

The vehicle service management system 12, the vehicle technician system 14, the vehicle owner system 16, and vehicle driver system 18 may communicate with each other through a network 24. Network 24 may include one or more private or public networks (e.g. the Internet) that enable the exchange of data. In general, vehicle technician system 14, vehicle owner system 16, and vehicle driver system 18 may communicate with one another through the vehicle management system 12. The vehicle management system 12 acts as a proxy to broker communication. For example, if a vehicle technician needs to transmit a message to the vehicle owner, the vehicle technician system 14 initiates communication with the vehicle management system 12 over network 24 and transmits the message from the vehicle technician system 14 to the vehicle management system 12. In turn, the vehicle management system 12 transmits the message from the vehicle management system 12 to the vehicle owner system 16. As such, the vehicle management system 12 may act to coordinate or act as a proxy between the vehicle technician, the vehicle owner, and the vehicle driver. Inasmuch as the vehicle technician may not know the vehicle owner or may not have a way to directly contact the vehicle owner, vehicle management system 12 provides a standard contact entity for the vehicle technician to interface with when servicing a vehicle.

Figure 2:
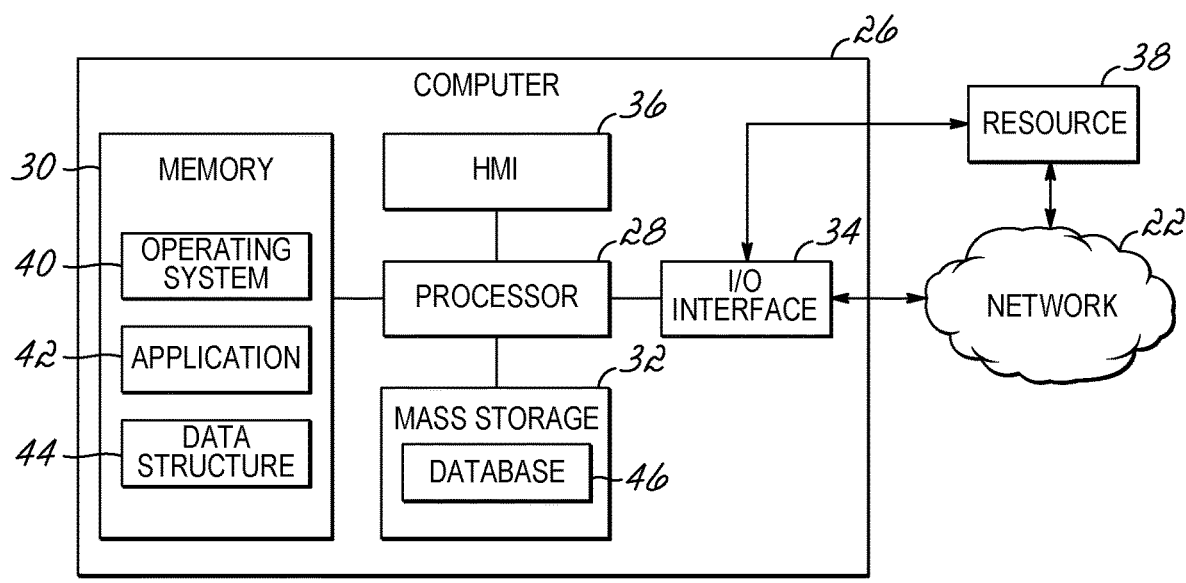
FIG. 2 is a diagrammatic view of an exemplary computer system of FIG. 1.

Referring now to FIG. 2, the vehicle service management system 12, vehicle technician system 14, vehicle owner system 16, vehicle driver system 18, and network 24 of operating environment 10 may be implemented on one or more computing devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. Memory 30 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

Processor 28 may operate under the control of an operating system 40 that resides in memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or external resource 38. The application 42 may thereby work cooperatively with the network 24 or external resource 38 by communicating via the I/O interface 34 to provide the various features, functions, applications, processes, or modules comprising embodiments of the invention. The application 42 may also have program code that is executed by one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, push-buttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules. In some embodiments, database 46 may also be remote to computer system 26 and accessible over network 24.

Figure 3:
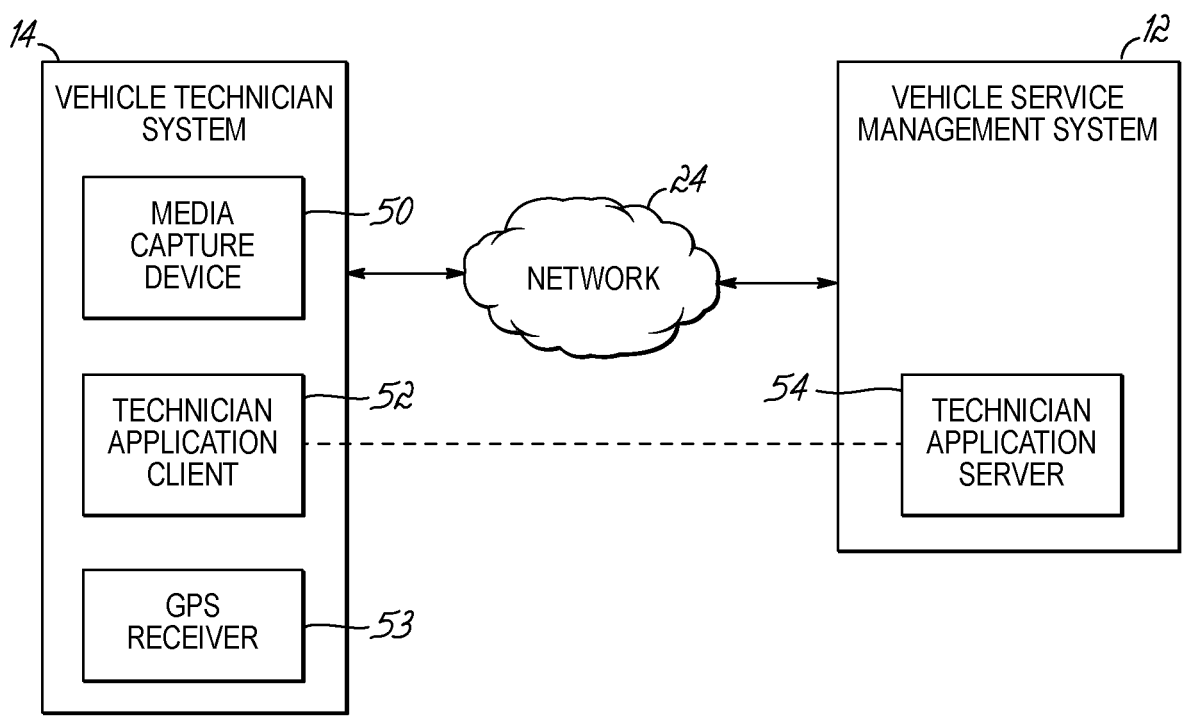
FIG. 3 is a schematic view of a vehicle technician system and a vehicle service management system.

Referring to FIG. 3, the vehicle technician system 14 includes a media capture device 50 for use in capturing media files. The media capture device 50 may comprise hardware, software, or a combination thereof. In one embodiment of the invention, the vehicle technician system 14 is a web-enabled mobile telephone and the media capture device 50 is a hybrid still image and video camera included in the mobile telephone. In this embodiment, the media capture device 50 may selectively capture digital still images or digital video in accordance with a setting of the vehicle technician system 14. The vehicle technician system further includes a technician application client 52 for use in facilitating communication between the vehicle technician and the vehicle owner. As shown with a dashed reference line in FIG. 3, the technician application client may be communicatively coupled with a technician application server 54 of vehicle service management system 12. While the dashed reference line is shown bypassing the network 24, communication between the technician application client 52 and the technician application server 54 occurs over network 24. Technician application client 52 and technician application server 54 may communicate to pass information regarding the vehicle and the service call therebetween. In an embodiment of the invention, the vehicle service management system 12 is operated by a third party which acts as a proxy or coordinating interface between the vehicle technician and the vehicle owner. While the vehicle application server 54 is illustrated in FIG. 3 as associated with the vehicle service management system 12, in another embodiment of the invention, the technician application server 54 may reside on vehicle owner system 16.

The service technician may use the technician application client 52 associated with the vehicle technician system 14 to aid in performing a service call after arriving at the location of a damaged vehicle. The technician application client 52 enables the vehicle technician system 14 to carry out a variety of communication functions with the vehicle owner through the vehicle service management system 12. In order to communicate with the vehicle owner, the repair technician may log onto the technician application client 52 by supplying an identification and password. This places the technician application 11 in communication with the vehicle service management system 12, via the network 24.

In an embodiment of the invention, vehicle service management system 12 includes the technician application server 54, which comprises a software program enabling vehicle service management system 12 to carry out a variety of communication functions and communicate with technician application client 52 on vehicle technician system 14 over the network 24. Rather than synchronous communication, which is typically provided by a direct telephone call over a circuit-switched communication link, the communication between technician application client 52 and technician application server 54 is asynchronous and facilitated by a packet-switched communication link built on the exchange of data packets. Technician application server 54 may maintain a list of pending roadside service events and facilitate communication between each roadside service technician and the vehicle owner. Technician application server 54 provides a user interface for use by the administrator in coordinating communication between the vehicle owner and the various roadside service technicians sending updates and information for review by the vehicle owner.

The technician application client 52 gives the repair technician the opportunity to log in. Logging in authenticates and identifies the roadside service technician as a proper user, and may provide the service technician with information associated with the vehicle owner, the vehicle owner's account, the vehicle itself, general information regarding the damaged part, specific information regarding the damaged part, or any combination thereof. For example, the technician application client 52 may provide the repair technician with information relating to whether the damaged part was previously repaired when the technician logs into the technician application client 52. In another example, the repair technician may also be provided with information regarding the vehicle owner or owner's account, such as the account number, service notes, billing requirements, and contact information. Through the technician application client 52, the repair technician may also be provided with information regarding the vehicle driver such as the driver's name and phone number, unit information such as the unit number and type of unit, breakdown information such as location and direction, and repair information such as wheel position, actions required, or products needed.

In one embodiment, a roadside service technician that has logged into the technician application client 52 can initiate a communication session with the vehicle owner through the technician application client 52. In doing so, the technician application server 54 provides a list of open service calls or service events currently pending and provides this list to technician application client 52. The roadside service technician reviews the list on the vehicle technician system 14 and selects the open service call assigned to the technician. The selection associates the roadside service technician and vehicle technician system 14 with a particular open service call in technician application server 54. The roadside service technician may then gather and confirm the details of the service with the vehicle owner through the communication between technician application client 52 and the technician application server 54. As shown in FIGS. 1 and 3, in an embodiment of the invention, the vehicle technician system 14 communicates with the vehicle management system 12 and the vehicle management system 12 in turn relays this information to the vehicle owner. Inasmuch as many vehicle technicians must communicate with many owners, vehicle management system 12 brokers the communication and provides a proxy for eliminating direct communication between the vehicle technicians and the vehicle owners.

Once the vehicle service technician and the vehicle owner are indirectly linked in communication through vehicle management system 12, the roadside service technician may provide details relevant to the nature of the damage or malfunction, as well as information regarding the nature of the vehicle, including the vehicle model, size, and any identification numbers such as a vehicle identification number (VIN), a license plate number, or a national auto glass specification (NAGS) number. Similarly, the roadside service technician may be provided important information from the vehicle owner or the central authority such as whether the damaged part was previously repaired. Further, the technician may be asked to verify information to ensure the technician and the vehicle owner are referencing the same vehicle. Information valuable to the roadside service technician during the repair may be accessed in a standardized section of the technician application client 52. For example, regarding a tire repair, information such as required tire pressure, preferred tread depth, or any other information relating to the vehicle may be provided to the technician through the technician application client 52.

In an embodiment of the invention, through the technician application client 52, the roadside service technician is able to view comments from the various parties related to the vehicle or the service call, such as the vehicle owner, fleet coordinators, or other agents. These comments can be any relevant information the roadside service technician may need or desire for servicing the vehicle. Similarly, the roadside service technician is able to enter comments into the technician application client 52 for the vehicle owner or other authority to view and consider. In another embodiment of the invention, the comments are provided as a live chat between the authority and the roadside service technician within the technician application client 52. The live chat may be through a text based communication such as a messaging program, or may be a live video chat between the two parties. In another embodiment of the invention, communication between the authority and the roadside service technician is live using a web services architecture against a cloud database similar to database 46 and accessed through network 24. As such, communication between each party may be conducted in essentially real-time.

In an embodiment of the invention, an offline mode is provided through the technician application client 52, whereby the data and information intended to be transmitted to the technician application server 54 is saved locally while the vehicle technician system 14 does not have a data connection to network 24. For example, in the embodiment of the invention where the vehicle technician system 14 comprises a cellular telephone, the offline mode allows data to reside on the cellular telephone while the telephone is not connected or out of range of a cellular tower. Once the cellular telephone becomes reconnected with a network capable of delivering the data to the technician application server 54, the offline mode provides this data and facilitates the transfer of the locally stored data when appropriate.

As shown in FIG. 3, the vehicle technician system 14 may include a media capture device 50 capable of generating digital media files such as still image files or motion video files. The vehicle technician system 14 may be configured to share the digital media files with the technician application client 52. In turn, the technician application client 52 may transmit the digital media files to the vehicle owner by way of the technician application server 54. The vehicle owner may visually inspect the still images or motion video of the digital media files and consider the details contained therein. Specifically, the roadside service technician may capture images related to the underlying damaged part of the vehicle and transmit these images to the vehicle owner for inspection. The images portray the damaged part inherently without bias and facilitates informed decisions by the vehicle owner regarding the servicing of the vehicle. For example, if the damaged part is a punctured tire resulting in a flat, the vehicle owner may be given the option of deciding whether to repair the tire or replace the tire completely. Often the decision on whether to repair or replace a punctured tire depends on the location of the damage. Damage inflicted on the sidewall portion of a tire is more likely to require replacement of the tire, while damage to the tread area may lend itself to simple repair of the tire. While the roadside service technician may provide a description of the location of the damage, the vehicle owner may be provided with an unbiased view of the damage through images captured by media capture device 50 and transferred to the vehicle owner through the technician application client 52. Similarly, if a windshield is cracked or chipped, often the size and placement of the damage dictates whether the windshield needs to be replaced or simply repaired.

Technician application client 52 may include functionality directed to providing the vehicle owner with status updates during the service call. The status update may be generated by manually selecting a graphical icon on the vehicle technician system 14 to quickly and asynchronously send the vehicle owner a status update through the technician application server 54. Providing consistent updates to the vehicle owner allows the vehicle owner to communicate the status of the service call to a client of the vehicle owner, for example, a merchant awaiting delivery of the goods stored on the vehicle. Receiving consistent and incremental status updates allows the vehicle owner to understand where the roadside service technician is within the service process and allows the vehicle owner to respond accordingly and to plan ahead. Technician application client 52 may include pre-formed incremental status updates. For example, technician application client 52 may include graphical buttons corresponding to "30% completed," "60% completed," and "90% completed." Technician application client 52 may alternatively include pre-formed broad status updates in graphical buttons corresponding to "En Route," "Arrived," "Service Completed," and "Returned." These buttons, when actuated by the roadside service technician, send the associated pre-formed status update to the vehicle owner. Inasmuch as the buttons are pre-formed, incremental, and linked to the vehicle owner, sending a status update requires minimal effort by the roadside service technician, thereby minimizing the disruption to the technician when providing status updates.

As shown in FIG. 3, in an embodiment of the invention, the vehicle technician system 14 includes a GPS receiver 53 for determining location coordinates of the vehicle technician system 14. As such, each time a service technician actuates a selected one or more buttons of the technician application client 52, GPS coordinates for the vehicle technician system 14 are collected from the GPS receiver 53, time-stamped, and transmitted to the vehicle service management system 12 via network 24 for storage. This information may thereafter be provided on a map or in a text message or other form of communication to the vehicle owner, vehicle driver, or the fleet owner/coordinator to provide information regarding the vehicle technician's whereabouts and incremental relative position. Further, this information may be used to determine an estimated time of arrival (ETA) in real-time and provide the ETA to the driver via text message or through a driver application.

Figure 4:
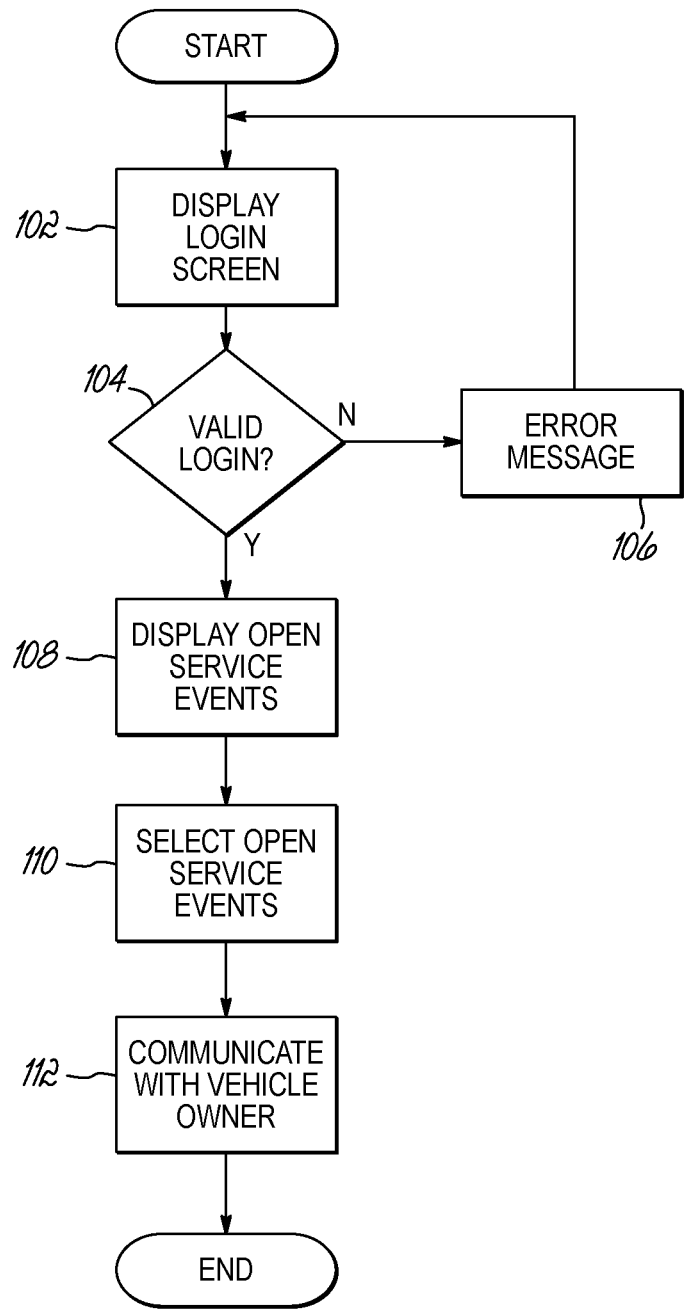
FIG. 4 is a flowchart illustrating a process for selecting an open service event.

FIG. 4 illustrates an example of a technician application client 52 process in more detail. In response to arriving at the location of a vehicle requiring roadside assistance, the roadside service technician manipulates the vehicle technician system 14 to initialize technician application client 52, typically by selecting a graphical user interface button on a home screen of the vehicle technician system 14. Once open, technician application client 52 provides a display login screen (block 102), whereby the technician enters login credentials such as a user identification and a password. Once the technician enters login information, technician application client 52 verifies whether the login information is valid (block 104), either delivering an error message and another opportunity to log in (block 106), or displaying a list of open service events (108) for the technician to review and select. Open service events are roadside service situations that may be in the area. For example, the list of open service events may display a flat tire service event on Road ABC and a windshield service event on Road XYZ. The technician reviews the list of open service events and selects the appropriate service event (block 110). The roadside service technician thereafter communicates with the vehicle owner or the vehicle service management system 12 through technician application client 52 (block 112), having been authenticated and having associated the particular technician application client 52 with a particular open service event.

Figure 7:
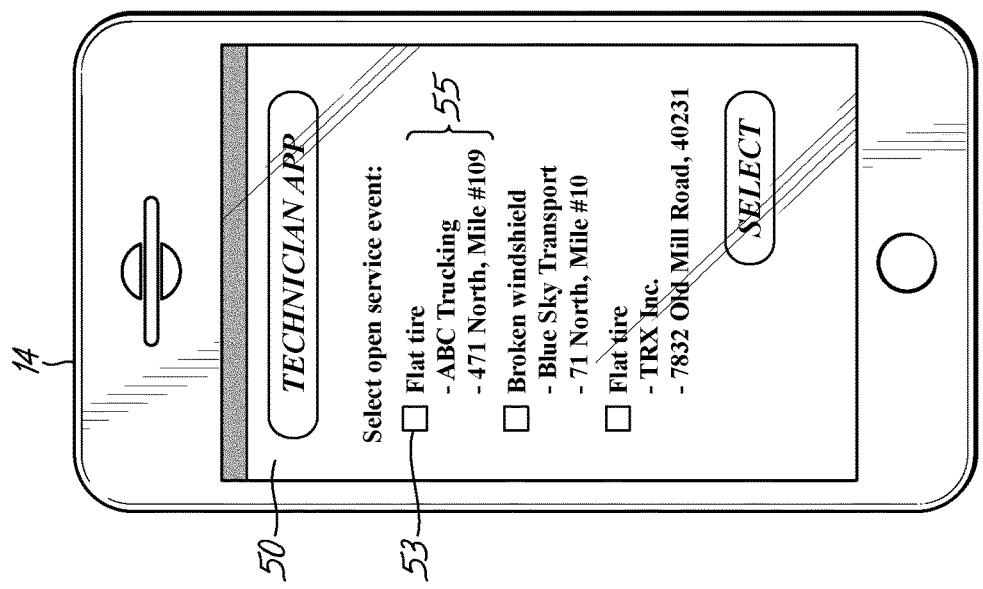
FIG. 7 is a graphical view of an exemplary service event list screen associated with a technician application.
Figure 6:
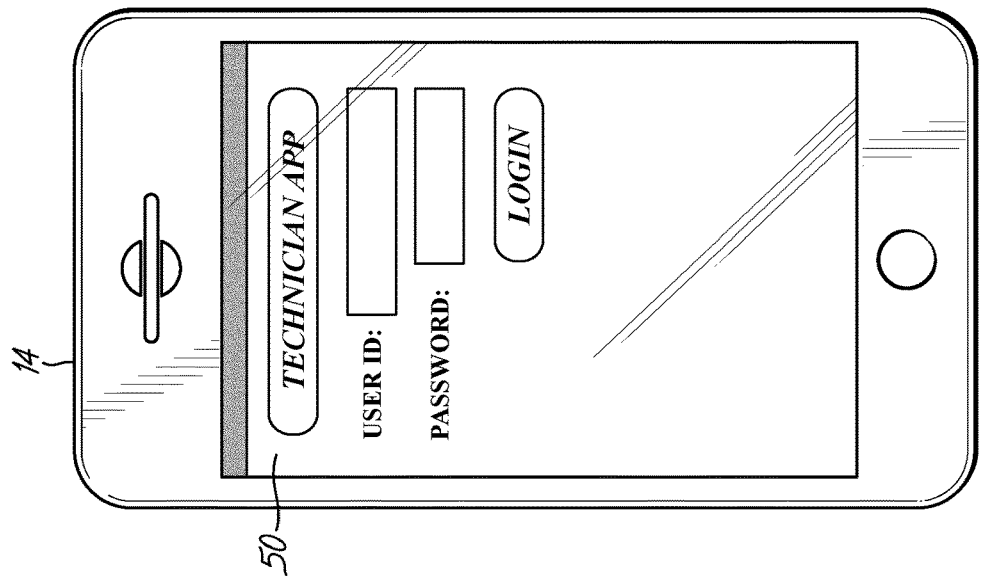
FIG. 6 is a graphical view of an exemplary log in screen associated with a technician application.

FIG. 6 shows an exemplary login screen in accordance with block 102 of FIG. 4. The exemplary login screen is displayed on an exemplary vehicle technician system 14 through an exemplary technician application client 52. Text blocks are available for a user identification and password, which when entered may be checked against a database accessible to the technician application client 52 to authenticate the technician. FIG. 7 shows an exemplary screen listing open service events in accordance with block 108 of FIG. 4. Selection boxes are positioned proximate a basic description of an open service event. For example, a selection box 53 is positioned proximate an exemplary open service event 55. Service event 55 is listed as a "Flat Tire" on a vehicle associated with "ABC Trucking" and located at "471 North, Mile #109". The technician selects the box proximate the relevant open service event and actuates the "SELECT" button to complete the selection. While selection boxes are shown and described herein, any method for selecting a particular open service event may be used without departing from the spirit of the invention.

In an embodiment of the invention, the vehicle driver system 18 contacts the vehicle service management system 12 to report a service event. The contact may be through a vehicle driver application (not shown) residing on the vehicle driver system 18 and in communication with the vehicle service management system 12 via the network 24. Vehicle service management system 12 may be configured to receive the communication regarding the service event from the vehicle driver system 18 and locate the technician that best matches a particular search criterion or multiple search criteria. The matching may be performed automatically by vehicle service management system 12 based on specifications provided by the vehicle owner to the vehicle service management system 12. For example, a vehicle owner may wish to specify a preference for particular service technicians, particular dealers or service companies, or any other preferences regarding the servicing of the vehicle owner's vehicle. As such, in an embodiment of the invention, no human being needs to be involved in the dispatching of a service technician. In this embodiment of the invention, vehicles in a vehicle owner fleet may get a technician assigned to the issue almost immediately. One exemplary search criterion may be geographical location to the service event, whereby the vehicle service management system 12 may identify the technician who is the closest technician to the vehicle. Once identified, the vehicle service management system 12 may contact the technician via the technician application client 52 of the vehicle service management system 12, for example, by sending a push notification. The technician is invited to either accept or reject the request to service the vehicle through the technician application client 52. If the technician declines the service request, the vehicle service management system 12 may be configured to search for the next closest technician meeting the search criterion. This allows a damaged vehicle to be assigned a technician almost immediately and at any time of the day without the intervention of a human dispatcher. Alternative, the vehicle service management system 12 may be configured to include a human dispatcher after the first technician declines the service request.

Vehicle service management system 12 may be configured to broker a service request by broadcasting a request for information to multiple service technicians in the area of the damaged vehicle by way of each technician's associated vehicle technician system 14. If interested in servicing the damaged vehicle, the technicians are invited to respond to the service request with an estimated time of arrival based on metrics associated with the technician such as current workload, distance from the damaged vehicle, availability of necessary equipment required to service the vehicle, or any other metric useful in determining an estimated time of arrival at the damaged vehicle. Vehicle service management system 12 may select the technician with the best reported estimated time of arrival after all of the polled technicians have reported back, or after a set amount of time has elapsed. Vehicle service management system 12 may be configured to thereafter select the technician with the shortest estimated time of arrival to provide the best service to the damaged vehicle. After a particular technician is selected by the vehicle service management system 12, the other technicians are notified that the service request has been filled and the service request to these non-servicing technicians is rescinded.

Figure 14:
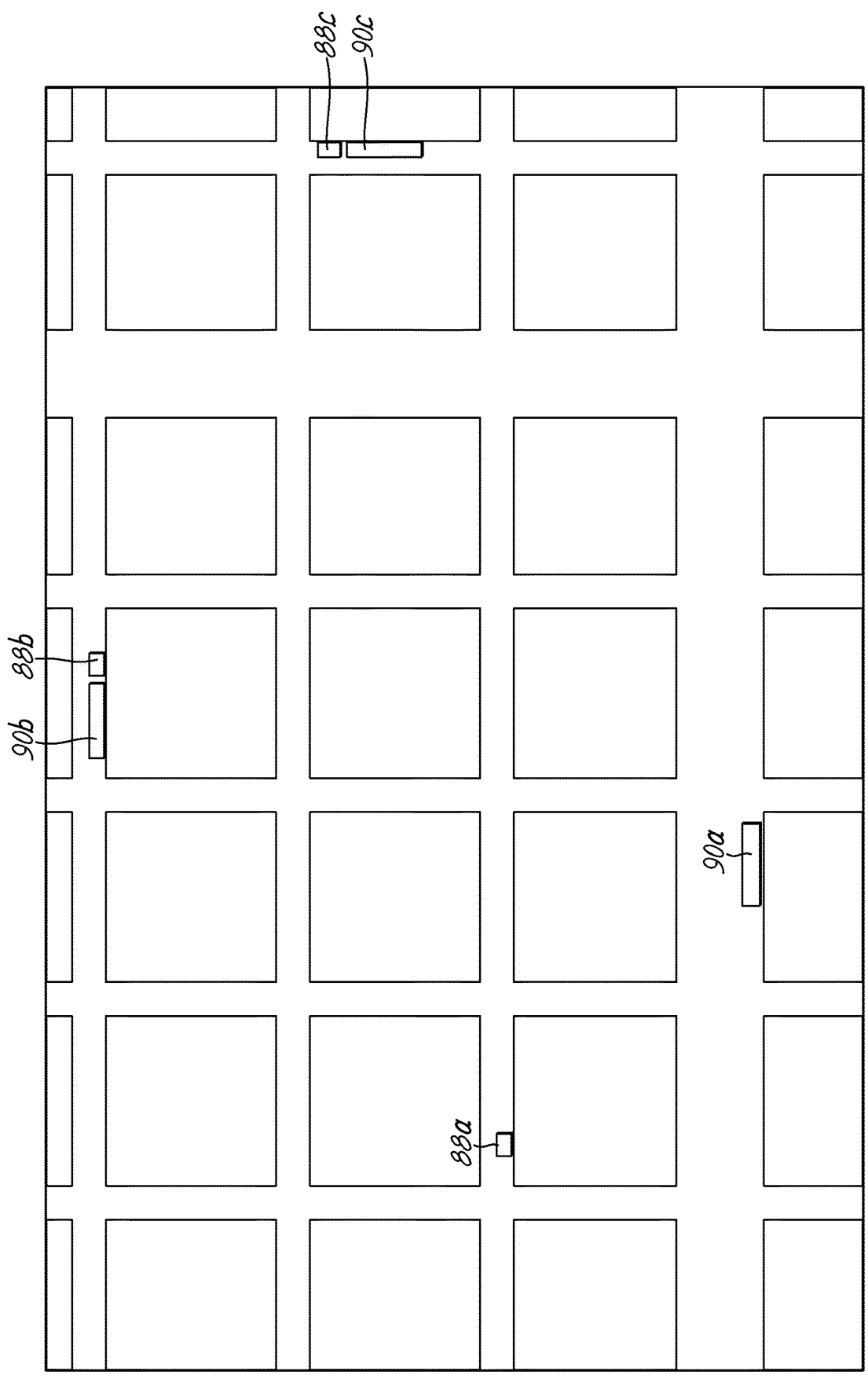
FIG. 14 is a top view of a map showing three service technicians and three vehicles.

This scenario is illustrated in FIG. 14, wherein one or more roadside service technicians may be responding to or in the area of a vehicle in need of a service call, shown as a vehicle 90A. FIG. 14 illustrates three roadside service technicians on a map of an area. A roadside service technician 88A is shown having completed a service call, a roadside service technician 88B is shown performing a service call on a vehicle 90B, and a roadside service technician 88C is shown performing a service call on a vehicle 90C. In this scenario, the driver of vehicle 90A contacts vehicle service management system 12 through vehicle driver system 18 and notifies the vehicle service management system 12 of the need for a service call on vehicle 90A. In response, the vehicle service management system 12 transmits a blast dispatch request to any roadside service technicians based on a given criterion or metric. In one embodiment of the invention, the blast dispatch is sent to each roadside service technicians in a specified area of vehicle 90A. As shown in FIG. 14, the three roadside service technicians in the area of vehicle 90A may be in the specified area and therefore will receive the blast dispatch request. Each technician will receive a service request notification on their associated vehicle technician system 14 and will have an opportunity to respond to the request with an estimated time of arrival at vehicle 90A. Vehicle service management system 12 thereafter determines which roadside service technician 88A, 88B, or 88C to assign to the servicing of vehicle 90A, based at least in part on the estimated response time from the technicians.

The technician application client 52 may be configured to access GPS receiver 53 included in the vehicle technician system 14 to acquire location data regarding the service technician. This location data may be provided to the technician application server 54 of vehicle service management system 12 to coordinate arrival at the damaged vehicle and to notify the vehicle owner through the vehicle owner system 16 and the driver through vehicle driver system 18 of the location of the technician assigned to the damaged vehicle. The vehicle driver may further be provided with dynamic updates regarding the estimated time of arrival of the technician. Further, vehicle owner system 16 or vehicle driver system 18 may include a map feature to display the location of the technician on a map with the location of the damaged vehicle also displayed.

Figure 5:
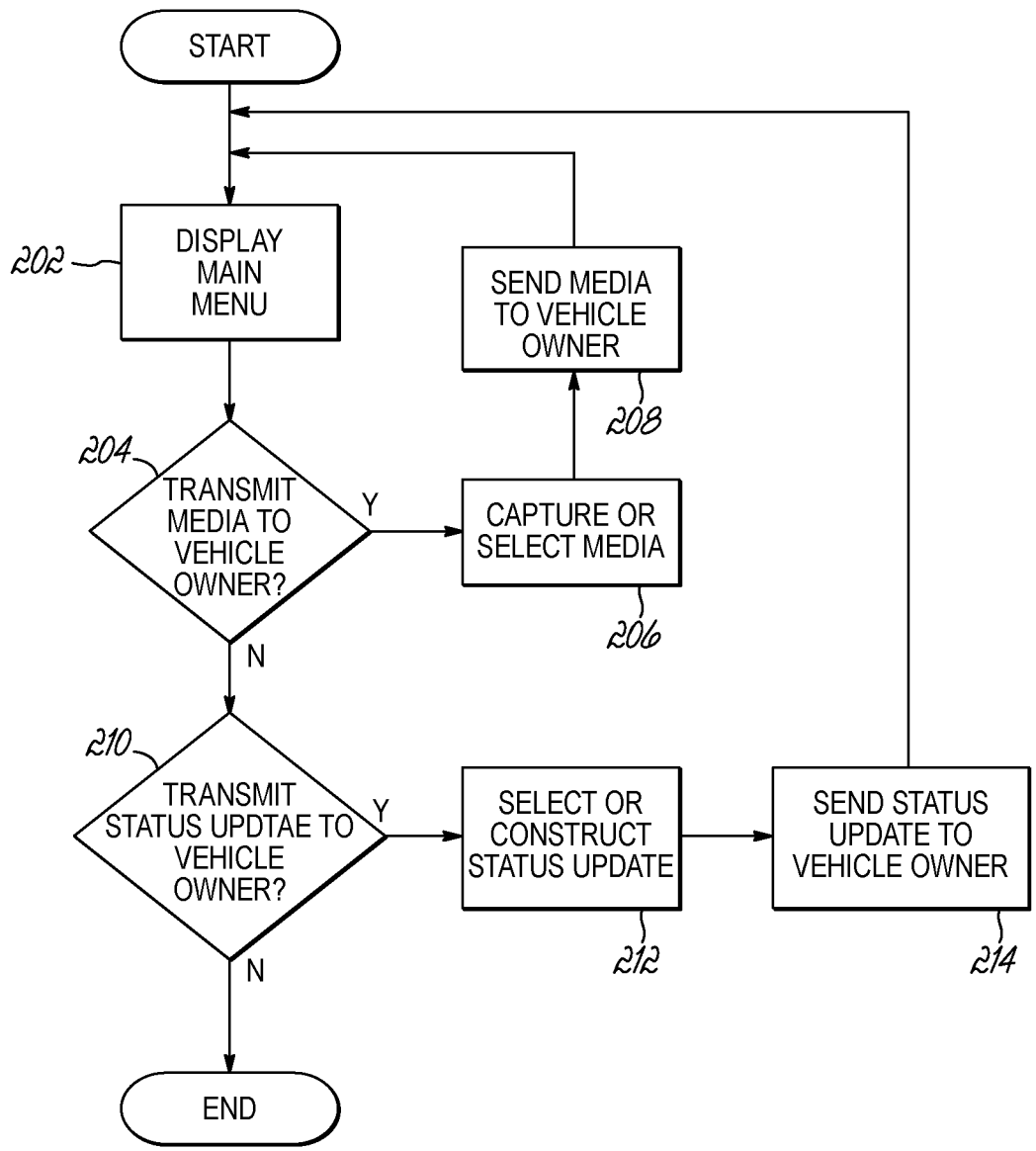
FIG. 5 a flowchart illustrating a process for navigating a menu to transmit media to a vehicle owner or transmit a status update to a vehicle owner.

FIG. 5 illustrates an example of a technician application client 52 process in more detail. After the roadside service technician is authenticated to use the technician application client 52 and after the technician selects an open service, a main menu is presented to the technician (block 202). The main menu presents the technician with the option to transmit media to the vehicle owner (block 204) or to transmit a status update to the vehicle owner (block 210). If the technician desires to transmit media to the vehicle owner, the technician either captures or selects the desired media (block 206). The technician may at this juncture use media capture device 50 of vehicle technician system 14 to capture an image or a video of the damaged part or any other relevant portions of the damaged vehicle. Alternatively, the technician may have already captured an image or a video previously and simply selects the desired media for transfer. Thereafter, the technician transfers the selected media to the vehicle owner (block 208). If the roadside service technician desires to transmit a status update to the vehicle owner (block 210), the technician may either construct a message by entering in the appropriate text, or alternatively, the technician application client 52 may include pre-formed status update messages which the technician may select as appropriate (block 212). For example "30% complete" for conveying to the vehicle owner that the technician estimates the service is almost one third complete. Thereafter, the technician transfers the status update to the vehicle owner (block 214).

Figure 8:
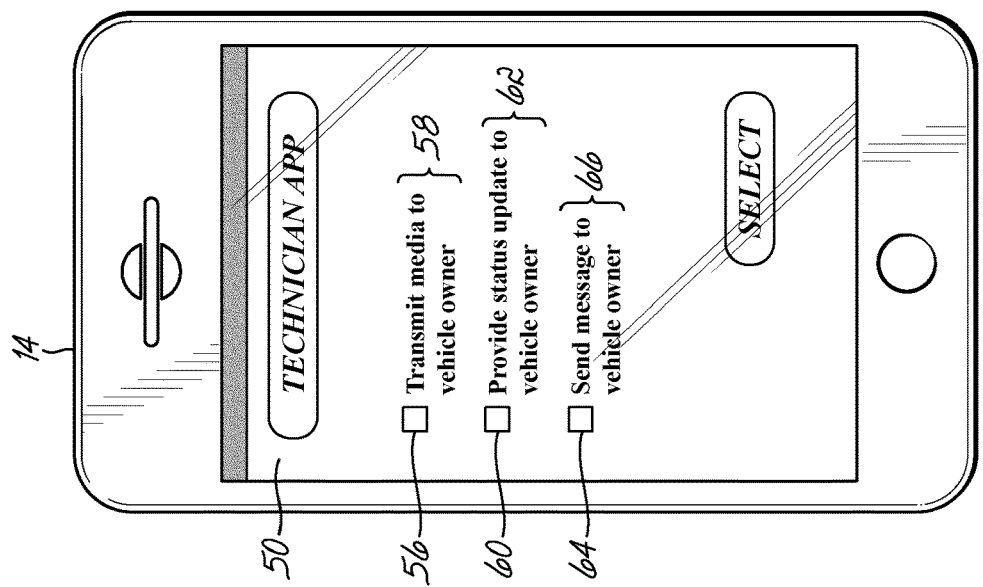
FIG. 8 is a graphical view of an exemplary menu screen associated with a technician application.

FIG. 8 shows an exemplary main menu display in accordance with block 202 of FIG. 5. The exemplary main menu is displayed on an exemplary vehicle technician system 14 through an exemplary technician application client 52. Selection boxes are positioned proximate a description of a menu option. For example, a selection box 56 is positioned proximate a menu option 58 with a description of "Transmit media to vehicle owner". The technician selects box 56 and actuates the "SELECT" button to indicate the technician desires to transmit media to the vehicle owner (block 204). Thereafter, the technician may either actuate the media capture device 50 to capture an image or a video of the damaged part (block 206) or select an image or video previously captured by the media capture device 50 (block 206). After the digital media is selected, the technician sends the selected digital media file to the vehicle owner (block 208). A selection box 60 is positioned proximate a menu option 62 with a description of "Provide status update to vehicle owner". A technician selects box 60 and actuates the "SELECT" button to indicate the technician desires to transmit a status update to the vehicle owner (block 210). Thereafter, the technician may either construct (block 212) or select a pre-formed status update (block 212) to send to the vehicle owner (block 214). FIG. 8 provides a selection box 64 positioned proximate a menu option 66 with a description of "Send message to vehicle owner". The technician selects box 64 and actuates the "SELECT" button to indicate that the technician desires to transmit a message to the vehicle owner. The message may be a free form text entry similar to a text message or may be a pre-formed message selected from a group of pre-formed messages.

Figure 9:
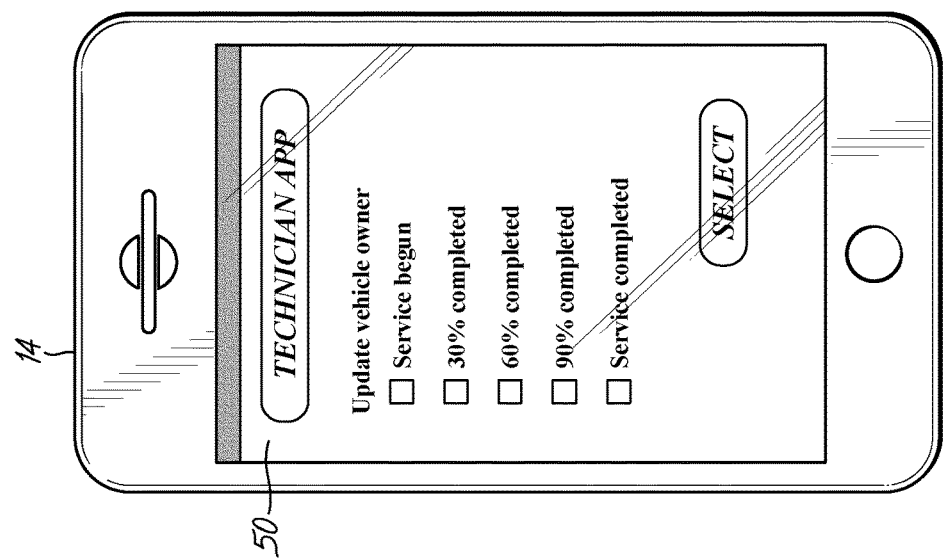
FIG. 9 is a graphical view of an exemplary status selection screen associated with a technician application.

FIG. 9 shows an exemplary display of a group of pre-formed status update messages the roadside service technician may send to the vehicle owner through technician application client 52. Any pre-formed status update in the group may be selected by the technician and send to the vehicle owner by actuating the "SELECT" button. This allows the technician to quickly send an update to the vehicle owner, regardless of whether the vehicle owner is available or responsive. Pre-forming the status update allows for a consistent and standardized feedback mechanism for the vehicle owner. The standardized status updates may be transformed into a graph or a chart within technician application server 54 and transmitted to the vehicle owner through vehicle owner system 16, which facilitates quick visual assessment by the vehicle owner of the status of the service event. Inasmuch as the vehicle owner may own and maintain an entire fleet of vehicles across a wide geographical area, standardized pre-formed status updates facilitate consistent and efficient understanding between the roadside service technician and the vehicle owner regarding the status of the service.

Figure 10:
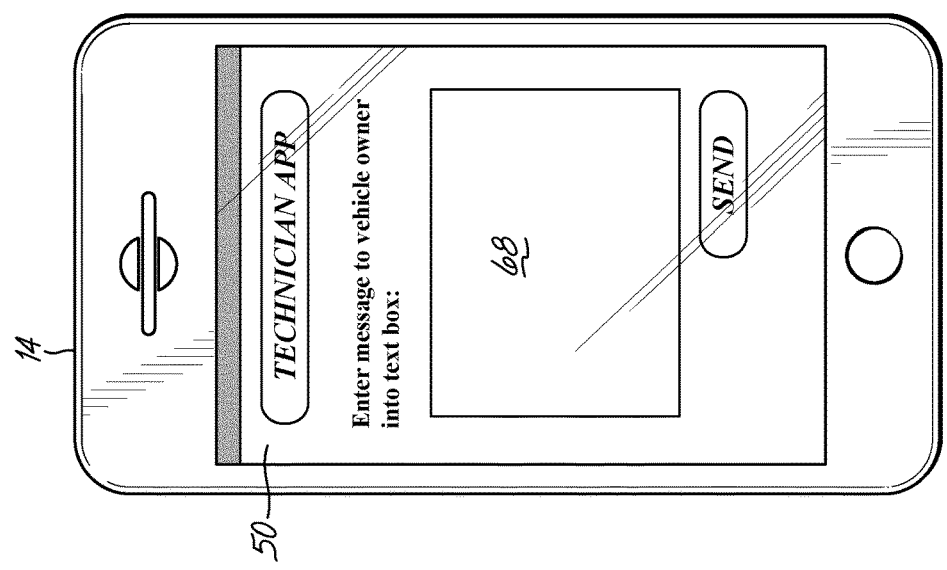
FIG. 10 is a graphical view of an exemplary message entry screen associated with a technician application.

FIG. 10 shows an exemplary display of a free-form text entry function to allow the technician to send a message to the vehicle owner through technician application client 52. In one embodiment of the invention, the technician types a message into a box 68 and actuates the "SEND" button to communicate the message to the vehicle owner. The vehicle owner may see a "pop-up box" or an alert on the screen of vehicle owner system 16 generated by technician application server 54. Alternatively, the vehicle owner may observe a new message notification or any other mechanism for prompting the vehicle owner to view the message.

Figure 11:
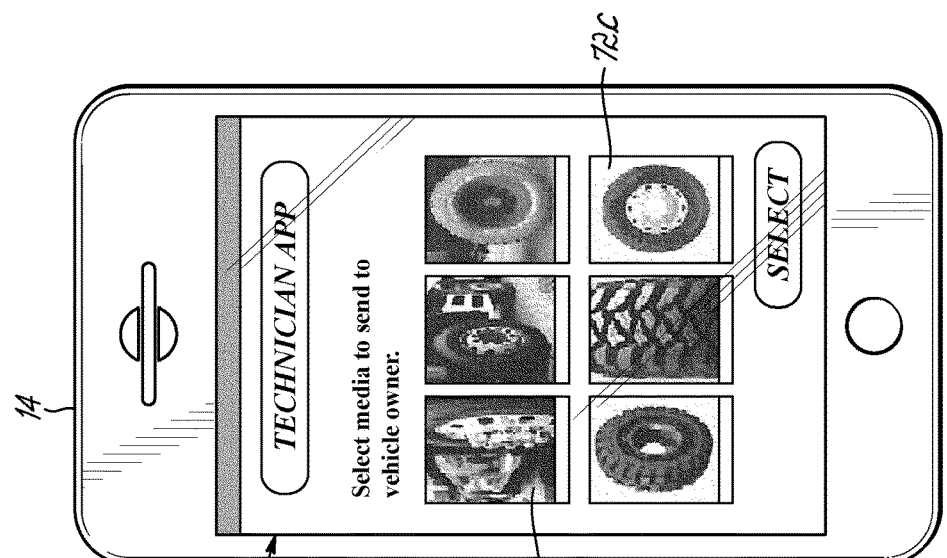
FIG. 11 is a graphical view of an exemplary media selection screen associated with a technician application.

FIG. 11 shows an exemplary embodiment of a media selection interface 70 of the technician application client 52. The media selection interface 70 collects media available to the technician on vehicle technician system 14 and displays a "thumbnail" representation of the media in a grid pattern for review by the technician. The technician selects the media for transmitting to the vehicle owner by clicking on the associated thumbnails. For example, the technician may desire to transfer the images associated with thumbnails 72A, 72B, and 72C. The technician selects these thumbnails by pressing on the interface of the vehicle technician system 14 to highlight the associated thumbnail. Thereafter, the technician actuates the "SELECT" button to communicate the underling digital media files associated with thumbnails 72A, 72B, and 72C to the vehicle owner. Upon receiving the selected digital media files, the vehicle owner may study and consider the transferred media to determine whether a damaged part should be repaired or replaced, or whether more information is needed from the roadside service technician.

Figure 12:
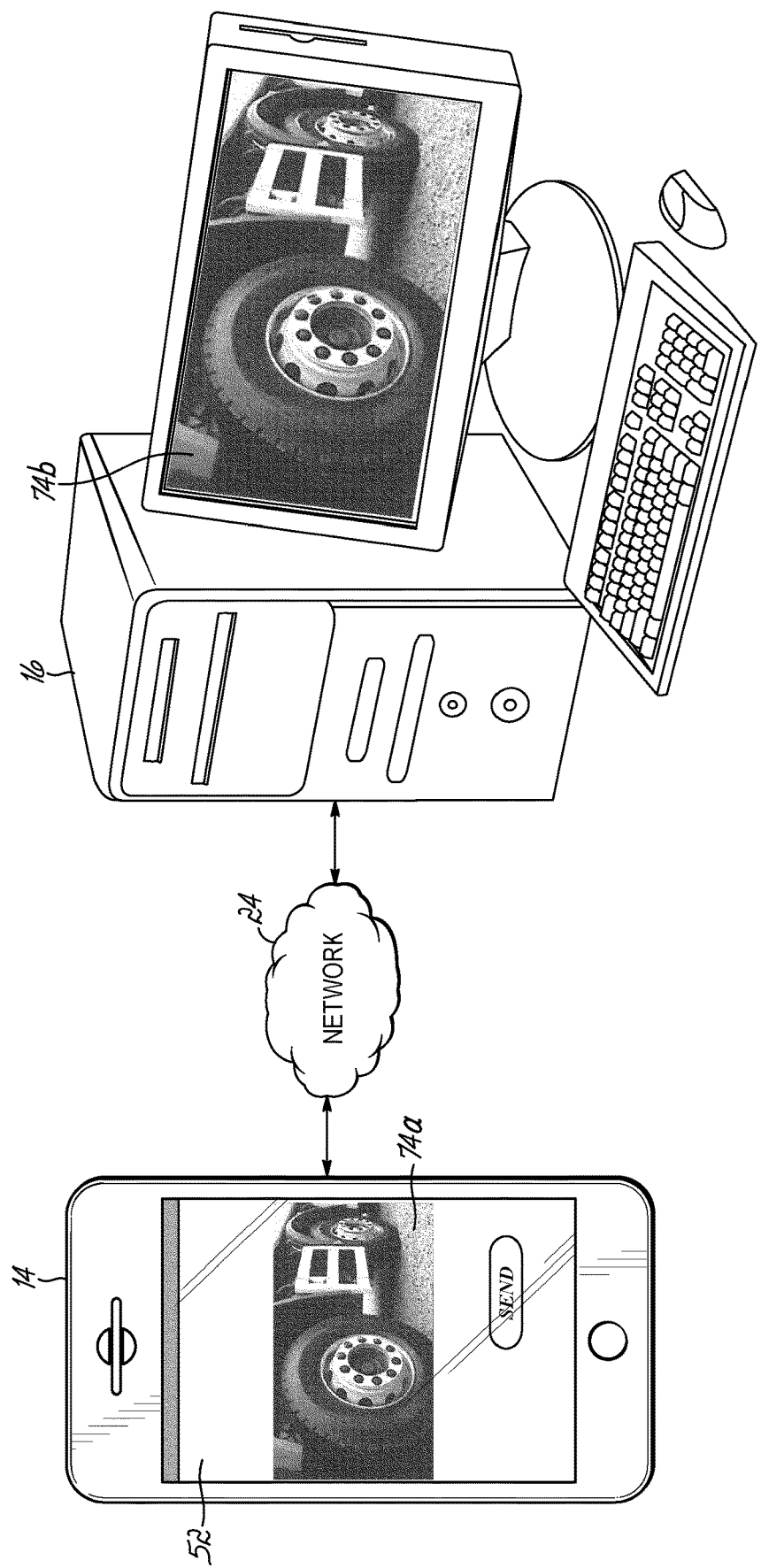
FIG. 12 is a graphical view of an exemplary technician application associated with a vehicle technician system and in communication with a vehicle owner system.

FIG. 12 shows an exemplary embodiment of the technician application client 52 displaying an image 74A and the vehicle owner system 16 displaying a corresponding larger version of the image, shown as image 74B. The vehicle owner may study and consider image 74B when making a determination whether to repair or replace the damaged part, shown in FIG. 12 as a truck tire. Image 74B is inherently unbiased and portrays the damaged part in situ, whereby the vehicle owner can study the damaged part and consider the merits of repair or replacement with a factual representation of the damage. While FIG. 12 illustrates vehicle technician system 14 communicating with vehicle owner system 16 through network 24, vehicle service management system 12 may act as a middleware service for receiving information from each of the vehicle technician system 14 and the vehicle owner system 16 and for transferring the information to the other party. As such, the vehicle owner system 16 and the overall interface the vehicle owner may use for communicating indirectly with the vehicle technician may be in the form of email, text messages, or any other communication mechanism. The technician application client 52 may be configured to utilize other applications or particular hardware functionality of the vehicle technician system 14 such as a video conferencing application and associated hardware or a voice communication application and the associated hardware. The technician may contact the vehicle service management system 12 through any method, include by way of voice telephone call, a video teleconference communication, a text message, etc.

Figure 13:
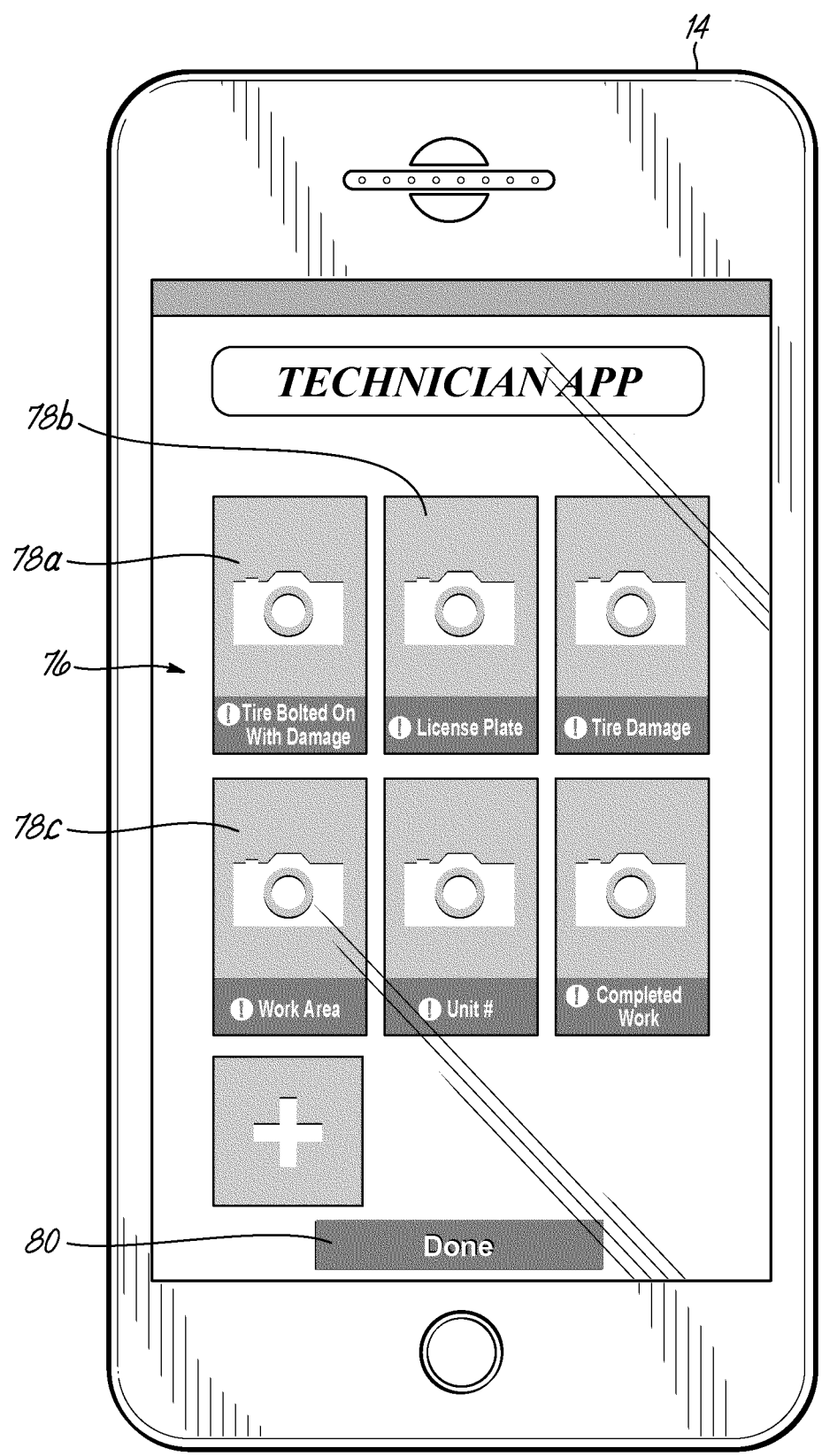
FIG. 13 is a graphical view of an exemplary media selection interface screen associated with a technician application.

As shown in FIG. 13, technician application client 52 may include a media prompt interface 76. The media prompt interface 76 includes several graphical elements, referred to as a prompts 78, having a corresponding indicia or indication of what specific media the user should provide. For example, as shown in FIG. 13, media prompt interface 76 provides a prompt 78A indicating that the user should acquire a photograph of the damaged tire bolted on the vehicle. Similarly, prompt 78B indicates that the user should acquire a photograph of the license plate of the vehicle, while prompt 78C indicates that the user should acquire a photograph of the work area. The vehicle owner or an intermediary using the vehicle service management system 12 may create prompts 78 per service event basis to prompt the technician for any specific media the vehicle owner or intermediary may desire. As such, the vehicle owner system 16 or vehicle management system 12 may include an interface allowing the vehicle owner or intermediary to create, modify, and delete prompts 78 for display on prompt interface 76.

When a vehicle technician views media prompt interface 76, the technician manually clicks or actuates a particular prompt 78. Thereafter, media capture device 50 is activated and the user manipulates the media capture device 50 to acquire the requested subject of the particular prompt 78. For example, when the user actuates prompt 78B, the media capture device 50 is activated and the user may use it to capture a picture of the vehicle's license plate. Thereafter, the technician application client 52 automatically uploads the captured media to vehicle service management system 12 or the technician may manually actuate the upload through a button on the media prompt interface 76 such as button 80.

In an embodiment of the invention, the roadside service technician is prompted to respond to a service survey of the vehicle whereby the technician records the status of relevant portions of the vehicle, such as the remaining wheels in a flat tire scenario. Media of the relevant other portions may be requested by the vehicle service management system 12 and supplied by the roadside service technician through vehicle technician system 14. As such, service issues may be identified before they present a problem to the vehicle.

Although the above embodiments are given with respect to a technician application accessed through a vehicle technician system such as a mobile communications device, it will be understood that the features of the application, including the interaction between the roadside service technician's device and the vehicle owner's device, can be carried out through a customized website accessible through a web browser of the mobile device. The technician application client 52 may be implemented or embodied in a series of web pages whereby the functionality of the overall invention may be implemented on the client side, the server side, or a combination thereof. For example, the technician application server 54 may be configured to implement or facilitate communication protocols or data storage and retrieval functionality, while the technician application client 52 may be configured to implement client side scripting functionality or rendering of the served web page data. Further, the digital media files may be streamed from the vehicle technician system 14 to either directly to the vehicle owner system 16 or indirectly through the vehicle service management system 12 and on to the vehicle owner system 16. The vehicle owner may thereby view the damaged part in essentially real-time via the streamed digital media files and communicate with the technician about the damaged part over an audio channel.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A communication system for providing roadside service calls to a vehicle owned by a vehicle owner and driven by a vehicle driver who is different from the vehicle owner, comprising:

a vehicle technician system associated with a vehicle technician and including a media capture device;
   a vehicle driver system associated with the vehicle driver;
   a vehicle owner system associated with the vehicle owner; and
   a service management system that brokers communication between the vehicle technician system, the vehicle driver system, and the vehicle owner system by providing a standard contact interface in which the vehicle technician system, the vehicle driver system, and the vehicle owner system do not have direct access to one another, wherein
   the service management system is configured to:
      receive a report of a service event from the vehicle driver system;
      in response to receiving the report, transmit a service request for an open service call associated with the vehicle owner system to the vehicle technician system,
      in response to receiving a service response from the vehicle technician system indicating the open service call has been selected, associate the vehicle technician system with the open service call,
      receive a media file from the vehicle technician system, and
      transmit the media file to the vehicle owner system; and
   the vehicle technician system is configured to:
      receive the service request from the service management system,
      display a list of open service calls including the open service call,
      in response to receiving input from the vehicle technician indicating the open service call has been selected from the list of open service calls, transmit the service response to the service management system,
      generate the media file with the media capture device, and
      transmit the media file to the service management system.

2. The communication system of claim 1, wherein the service management system is further configured to:
   maintain the list of open service calls; and
   transmit the open service call to the vehicle technician system as part of the list of open service calls.

3. The communication system of claim 2, wherein the service management system is further configured to:
   in response to receiving the report, add the service event to the list of open service calls.

4. The communication system of claim 3, wherein the vehicle technician system is one of a plurality of vehicle technician systems each associated with a different vehicle technician, and the service management system is further configured to:
   identify a first vehicle technician system from the plurality of vehicle technician systems as being a best match to the service event; and
   transmit the service request for the open service call associated with the service event to the first vehicle technician system.

5. The communication system of claim 4, wherein the service management system is further configured to:
   in response to the first vehicle technician system declining the service request, transmit the service request to a second vehicle technician system.

6. The communication system of claim 1, wherein the service management system is further configured to:

receive a report of a service event from a driver system;
in response to receiving the report, identify a plurality of vehicle technician systems that match the service event; and
broadcast the service request to the plurality of vehicle technician systems.

7. The communication system of claim 6, wherein the service management system is further configured to:
in response to receiving more than one service response from the plurality of vehicle technician systems, determine an estimated time of arrival to the service event for each vehicle technician system of the plurality of vehicle technician systems from which a respective service response is received;
select the vehicle technician system having a shortest estimated time of arrival; and
transmit a notification to the selected vehicle technician system indicating the vehicle technician system has been selected.

8. The communication system of claim 6, wherein the plurality of vehicle technician systems are the vehicle technician systems within a specified area of the driver system.

9. The communication system of claim 1, wherein:
the vehicle technician system is further configured to:
acquire location data regarding its position, and
transmit the location data to the service management system; and
the service management system is further configured to:
determine, based at least in part on the location data, an estimated time of arrival at a service event associated with the open service call, and
transmit the estimated time of arrival to the vehicle owner system.

10. The communication system of claim 9, wherein the vehicle owner system is further configured to display a map indicating a location of the vehicle technician system and the location of the service event.

11. A method of providing roadside service calls to a vehicle owned by a vehicle owner and driven by a vehicle driver different from the vehicle owner using a communication system including a vehicle technician system associated with a vehicle technician and having a media capture device, a vehicle driver system associated with the vehicle driver, a vehicle owner system associated with the vehicle owner, and a service management system that brokers communication between the vehicle technician system, the vehicle driver system, and the vehicle owner system by providing a standard contact interface in which the vehicle technician system, the vehicle driver system, and the vehicle owner system do not have direct access to one another, the method comprising:
receiving a report of a service event from the vehicle driver system at the service management system;
in response to receiving the report, transmitting a service request for an open service call associated with the vehicle owner system from the service management system to the vehicle technician system;
in response to the service management system receiving a service response from the vehicle technician system indicating the open service call has been selected, associating the vehicle technician system with the open service call;
receiving the service request from the service management system at the vehicle technician system;
displaying a list of open service calls including the open service call on the vehicle technician system;
in response to receiving input at the vehicle technician system from the vehicle technician associated with the vehicle technician system indicating the open service call has been selected from the list of open service calls, transmitting the service response from the vehicle technician system to the service management system;
generating a media file with the media capture device;
transmitting the media file from the vehicle technician system to the service management system;
receiving the media file from the vehicle technician system at the service management system; and
transmitting the media file from the service management system to the vehicle owner system.

12. The method of claim 11 further comprising:
maintaining the list of open service calls; and
transmitting the open service call to the vehicle technician system as part of the list of open service calls.

13. The method of claim 12 further comprising:
in response to receiving the report, adding the service event to the list of open service calls.

14. The method of claim 13, wherein the vehicle technician system is one of a plurality of vehicle technician systems, and further comprising:
identifying a first vehicle technician system from of the plurality of vehicle technician systems as being a best match to the service event; and
transmitting the service request for the open service call associated with the service event to the first vehicle technician system.

15. The method of claim 14, further comprising:
in response to the first vehicle technician system declining the service request, transmitting the service request to a second vehicle technician system.

16. The method of claim 11, further comprising:
receiving a report of a service event from a driver system;
in response to receiving the report, identifying a plurality of vehicle technician systems that match the service event; and
broadcasting the service request to the plurality of vehicle technician systems.

17. The method of claim 16, further comprising:
in response to receiving more than one service response from the plurality of vehicle technician systems, determining an estimated time of arrival to the service event for each vehicle technician system of the plurality of vehicle technician systems from which a respective service response is received;
selecting the vehicle technician system having a shortest estimated time of arrival; and
transmitting a notification to the selected vehicle technician system indicating the vehicle technician system has been selected.

18. The method of claim 16, wherein the plurality of vehicle technician systems are the vehicle technician systems within a specified area of the driver system.

19. The method of claim 11, further comprising:
acquiring location data regarding a position of the vehicle technician system;
transmitting the location data to the service management system;
determining, based at least in part on the location data, an estimated time of arrival at a service event associated with the open service call; and
transmitting the estimated time of arrival to the vehicle owner system.

20. The method of claim 19, further comprising:

displaying, on the vehicle owner system, a map indicating a location of the vehicle technician system and the location of the service event.

* * * * *